Nov. 3, 1942.  T. V. ATKINS  2,300,902
MERCHANDISE DISPLAY APPARATUS
Filed Dec. 14, 1940  3 Sheets-Sheet 1
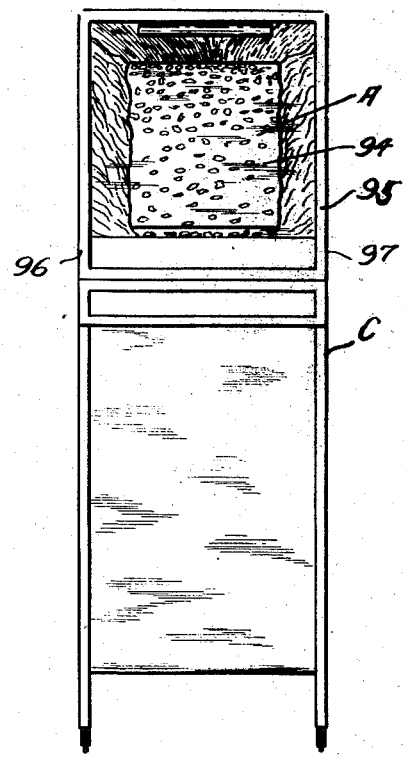
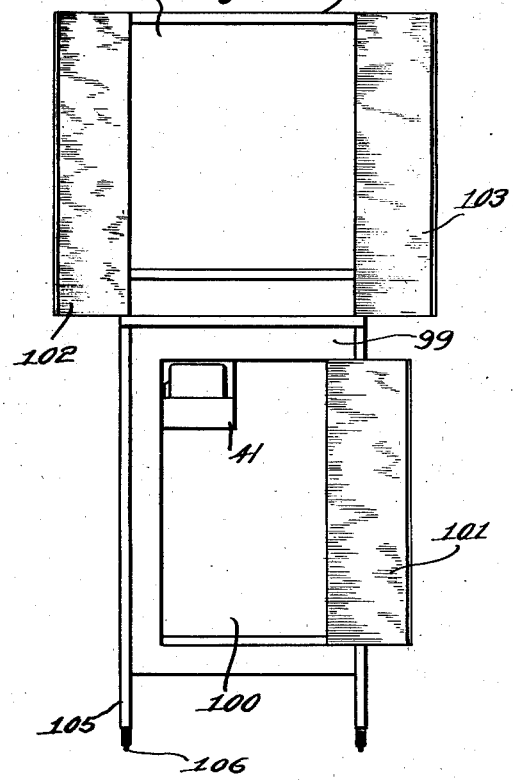
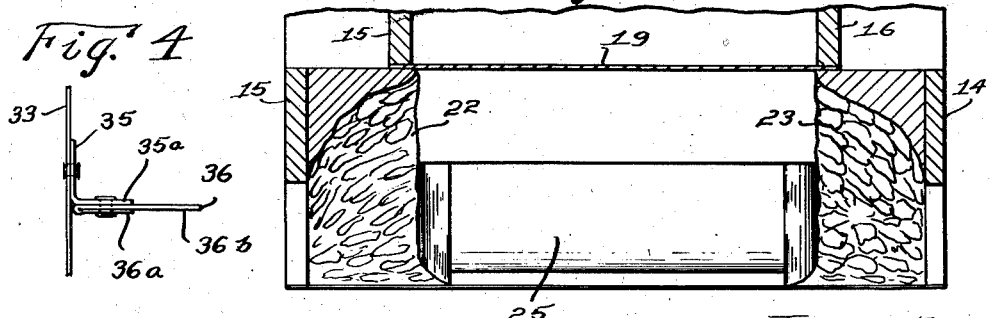
Inventor
Thomas V. Atkins
by Harold E. Cole
Attorney

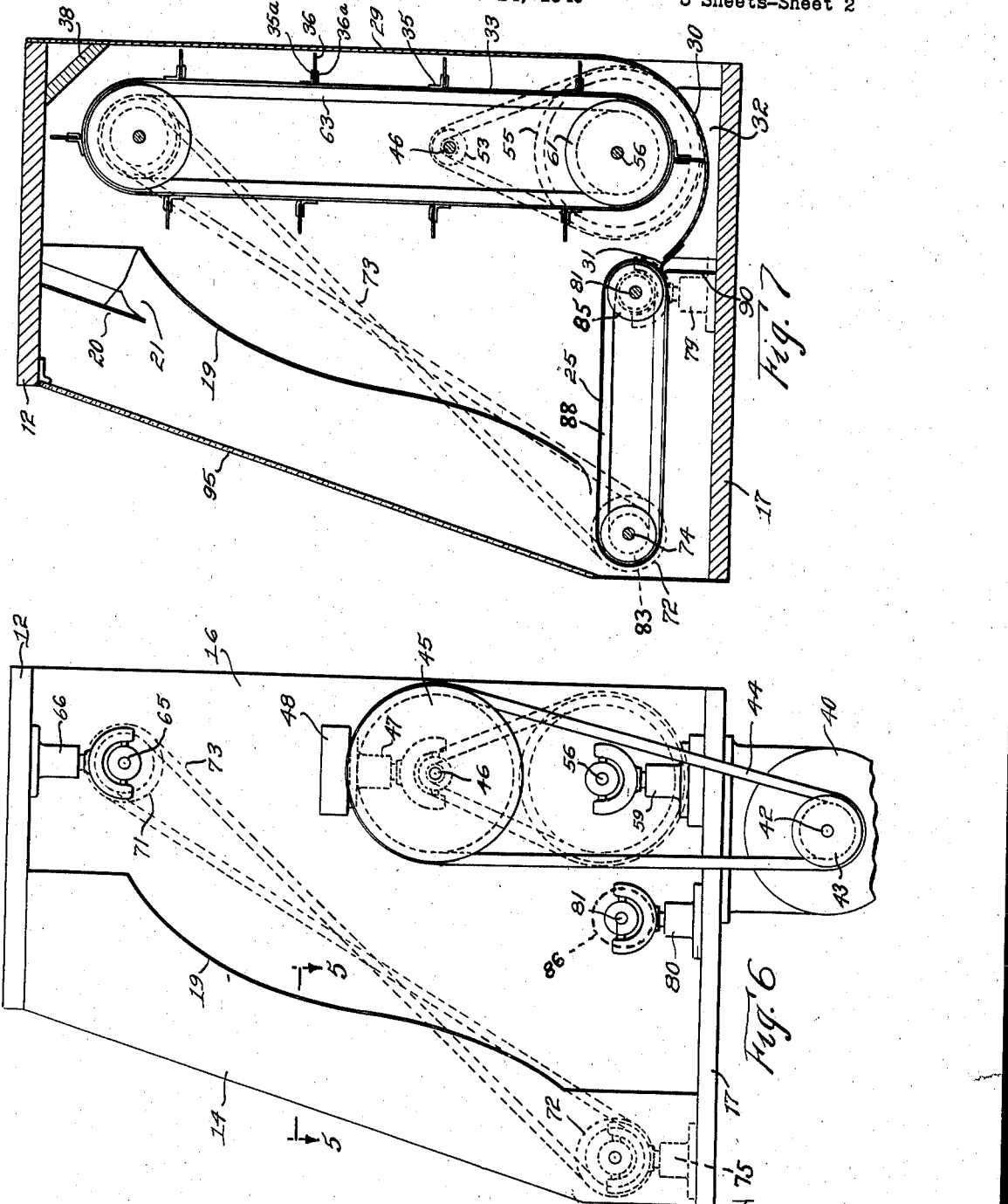

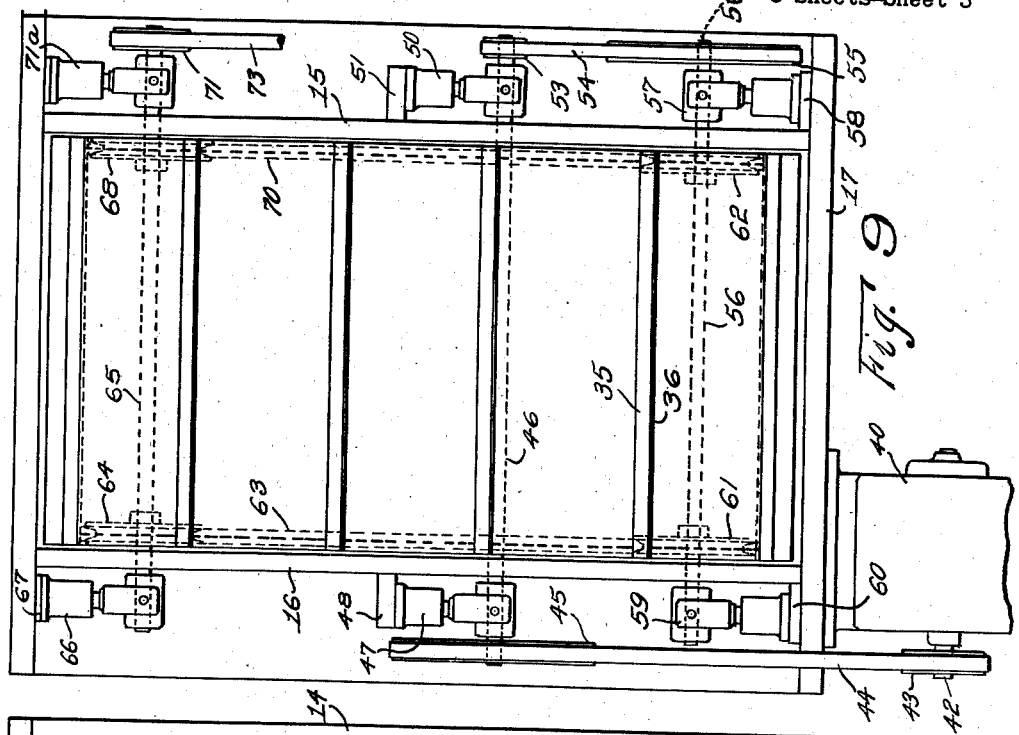
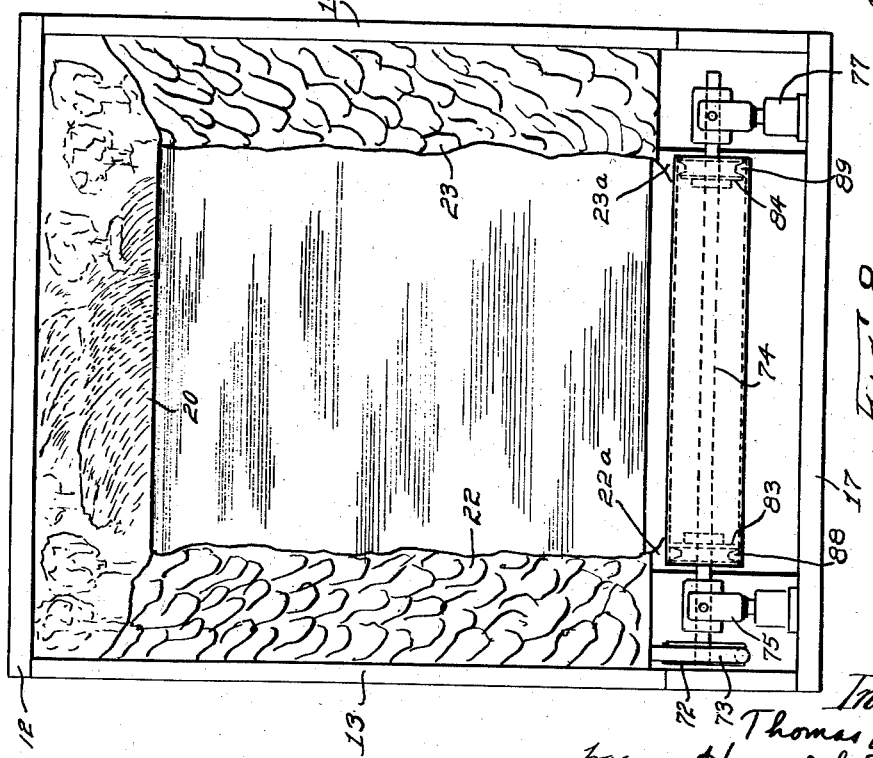

Patented Nov. 3, 1942

2,300,902

UNITED STATES PATENT OFFICE 2,300,902

MERCHANDISE DISPLAY APPARATUS

Thomas V. Atkins, Burlington, Mass., assignor to Harvey C. Wheeler, Brookline, Mass.

Application December 14, 1940, Serial No. 370,161

13 Claims. (Cl. 40—126)

This invention relates to a device to display articles such as popcorn or other merchandise, and particularly to a device that causes movement of said articles.

The principal object of my invention is to provide a device that will cause a confection such as popcorn to be delivered at a certain point and there fall downwardly in a manner like water falls over a waterfall. It is particularly adapted for popcorn.

Another object is to provide mechanism therefor that is reliable and endless in operation and that can uninterruptedly deliver a sufficient quantity of popcorn or other articles to provide a practically unbroken flow of it down the front of my device where it is visible, thus, resembling the action of a continuous stream of water pouring over the falls.

The foregoing and other objects which will appear as the nature of the invention is better understood, may be accomplished by a construction, combination and operative arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

In the drawings:

Figure 1 is a front elevational view of my complete device.

Figure 2 is a rear elevational view of said device, showing the upper and lower doors open.

Figure 3 is a sectional detail view of a conveyor with belt attached.

Figure 4 is a large detail view of a portion of the vertical conveyor, showing a lifter member having a flexible blade that picks up and carries the display articles upwardly to the point where they fall off.

Figure 5 is a sectional view taken on the line 5—5 of Figure 6.

Figure 6 is a side elevational view of the housing that supports the actuating mechanism of my device, showing part of said mechanism.

Figure 7 is an interior side sectional view taken within the said housing shown in Figure 5.

Figure 8 is a front elevational view of said housing.

Figure 9 is a rear elevational view of said housing with the back plate removed.

As illustrated my device has a main cabinet C which encloses a housing H in which the principal display mechanism is mounted. Said housing H has a top 12, a left side 13 near the front and a right side 14 near the front, a larger inset left side 15 extending rearwardly and a larger inset right side 16 extending rearwardly and a bottom 17. Within said housing H at the front portion is a front falls guide sheet 19 which is preferably colored to resemble water and which remains stationary. The articles A of merchandise to be displayed such as popcorn or novelties, drop down in front of this sheet 19, which is preferably rounded at its upper portion and extends downwardly and also preferably slants slightly outward towards the front of my device. Extending downwardly from said housing top 12 is a vizor member 20 that is forward of and spaced as at 21 from said guide sheet 19. Interior side portions 22 and 23 extend from said guide sheet 19 outwardly and forwardly to said cabinet sides 13 and 14, and they also have inwardly extending guide plates 22a and 23a preferably made of rubber that extend below said guide sheet 19, being spaced therefrom. Said interior side portions 22 and 23 serve as guides and also provide ornamentation and scenery.

Below said guide sheet 19 is a horizontal conveyor 25 that may be made of cloth, and is of the endless type. It is spaced as at 26 from the bottom edge of said guide sheet 19. Articles of merchandise A drop onto said endless conveyor 25 which carries them rearwardly as it rotates as will be more fully explained.

Fastened to the rear edges of said larger sides 15 and 16 is a back plate 29 which is rounded at the bottom into the shape of a trough 30 terminating in an upwardly extending portion having a rubber apron 31 at its extremity. Said trough 30 extends below a vertical conveyor 33 to said horizontal conveyor 25 from which said articles A drop off into said trough 30. At its opposite side edges it has supporting members 32 which are flat on the bottom and give said trough stability.

Said vertical endless conveyor 33 extends from a point spaced from said housing bottom 17 to a point upwardly spaced from said top 12. Fastened thereto at various portions spaced apart is a right angled lifter member 35 whose horizontally extending portions 35a extend outwardly from said conveyor 33 and to which is attached blade members 36 made of rubber or other yieldable material that extend beyond said portions 35a, and gather up said articles in said trough 30 as said conveyor 33 rotates. Said blade members 36 each has an attaching portion that is looped over as at 36a from which a single thickness of actual blade portion 36b extends outwardly. As said conveyor 33 is rotated said blades 36b touch or come close to said trough 30 and gather up and retain said articles in said trough as said conveyor 33 travels upwardly. Inasmuch as said blades 36b touch or almost reach said back plate 29 said articles cannot drop off said blales 36b, and are carried to the top of said conveyor 33 where they fall off the edge and down in front of said guide sheet 19 in much the same manner water falls down a water falls. Said articles A drop onto said horizontal conveyor 25 and thence are carried to a point rearwardly where they drop into said trough 30 and again are scooped up by said blades 36b and carried up again as aforesaid. Extending between said sides 15 and 16 and downwardly from said top is a slanting guard member 38 to which the top of said back plate 29 is attached.

The driving means for my device has an electric motor 40 that is set in a casing 41 extending below and attached to said housing bottom 17. A pulley 43 is attached to a shaft 42 of said motor on which is an endless pulley belt 44 that extends upwardly to and fits over another and larger pulley 45 which is fastened to a counter shaft 46 that is supported in a hanger 47 which in turn is attached to a cleat 48 that is attached to said right side 16. Said counter shaft 46 extends across said housing H and through a hanger 50 that is attached to a cleat 51 that is fastened to said housing side 15. A small pulley 53 is mounted on said counter shaft 46 on which is a belt 54 that extends downwardly to a large pulley 55 that is mounted on a drive shaft 56 that is supported by a hanger 57 which is fastened to a block 58 that is attached to said housing bottom 17. The speed of said driving means has now been reduced to the desired extent.

Said shaft 56 extends through said housing H to a hanger 59 that is fastened to a block 60 which is attached to said housing bottom 17.

A large pulley 61 is mounted on said shaft 56 just inside said housing right side 16 and a similar pulley 62 is mounted thereon just inside said housing left side 15. A belt 63 is sewed on the inside of said conveyor 33 and fits on said pulley 61 and extends upwardly the length of said conveyor 33 and fits on another large pulley 64 near the top of said housing H which pulley 64 is mounted on a shaft 65 that extends across said housing H, being supported outside said housing right side 16 by a hanger 66 that is attached to a block 67 which is fastened to said housing top 12. Mounted on said shaft 65 just inside said housing left side 15 is a large pulley 68 and a belt 70 that is attached to the inside of said sheet conveyor 33, and fits on said pulley 68 and extends downwardly to said pulley 62 near the housing bottom 17. Thus it will be noted that as shafts 56 and 65 are rotated said endless conveyor 33 rotates carrying said lifter members 35 up and down and around with it.

Extending downwardly from an upper left pulley 71 that is mounted on a hanger 71a fastened to said housing top 12 is a longer belt 73 which is crossed. Said pulley 71 is mounted on a shaft 74 that extends across said housing H, being mounted in a hanger 75 that is attached to the left portion of said housing bottom 17. At its opposite end said shaft 74 is mounted in a hanger 77 that is fastened to the right front portion of said housing bottom 17. Another pair of hangers 79 and 80 rearwardly of said hangers 75 and 77 are mounted on left and right sides of said housing bottom 17, and a shaft 81 is mounted in and extends between said hangers 79 and 80. Adjacent to each of said hangers 75, 77, 79 and 80 are pulleys respectively 83, 84, 85 and 86. Sewed to the interior of and at the left side edge of said endless horizontal conveyor 25 is a belt 88 which runs on said pulleys 83 and 85. A similar belt 89 is sewed to the interior of and at the right side edge of said conveyor 25 which runs on said pulleys 84 and 86. Inasmuch as said long belt 73 is crossed said shaft 74 is rotated in a direction that causes the top surface of said horizontal conveyor 25 to travel rearwardly thus bringing the said articles A back to said trough where they are gathered up by said conveyor blades 36 and carried upwardly by said conveyor 33 as heretofore described.

A stop cleat 90 is fastened to said housing bottom 17 and extends across it, being located near the rear edge of said horizontal conveyor 25. This prevents any of said articles from passing along said housing bottom 17 towards the front.

To enlarge my device and provide storage space I provide a main outside cabinet C which includes a top 93, a front 95, containing a glass front 94 for said housing H to permit a view of said articles falling, a left side 96 and a right side 97. It has a back 99 and a lower storage chamber 100 which is closed by a door 101. There are also two doors 102 and 103 in the upper portion thereof, which closes a storage space 104 provided rearwardly of said back plate 19. Four legs 105 with casters 106 are also provided.

What I claim is:

1. Apparatus for displaying popcorn and the like comprising a housing, a curved guide sheet extending from the upper portion of said housing downwardly, a conveyor below said guide sheet adapted to receive articles and carry them rearwardly, and another conveyor to receive said articles and carry them upwardly above said guide sheet, and means to actuate said conveyors.

2. Merchandise display apparatus comprising a housing embodying exterior opposite side members, interior opposite side members extending therefrom inwardly, a guide sheet extending from the upper portion of said housing and between said interior side members downwardly, a conveyor below said guide sheet adapted to receive articles and carry them rearwardly in said housing and another conveyor to receive said articles and carry them upwardly above said guide sheet, and means to actuate said conveyors.

3. Merchandise display apparatus comprising a housing embodying exterior opposite side members, interior opposite side members extending therefrom inwardly and rearwardly, a guide sheet extending from the upper portion of said housing downwardly and extending between and fastened to said interior side members, a conveyor below said guide sheet to receive articles and carry them rearwardly in said housing and another conveyor to receive said articles and carry them upwardly above said guide sheet, and means to actuate said conveyors, part of which is between said exterior and interior side members.

4. Merchandise display apparatus comprising a housing embodying exterior opposite side members, interior opposite side members extending therefrom inwardly and rearwardly, a guide sheet extending from the upper portion of said housing downwardly and extending between and fastened to said interior side members, said interior side members having guide plates extending below said guide sheet, conveyor means lower than said guide sheet to receive articles and carry them until they reach a point above said guide sheet, and means to actuate said conveyor means.

5. Merchandise display apparatus comprising a housing, a guide sheet supported in said housing and extending downwardly the lower portion of which extends inwardly, an endless conveyor below said guide sheet lower portion and extending rearwardly, an endless conveyor extending upwardly, a back plate for said housing embodying a trough portion that extends lower than and between said endless conveyors, said back plate extending up the back of said housing adjacent to said upwardly extending conveyor whereby it serves as a guide plate to prevent articles being carried upwardly by said conveyor from dropping off, and means to actuate said conveyors.

6. Merchandise display apparatus comprising a housing, a guide sheet supported in said housing and extending downwardly, an endless conveyor below said guide sheet and extending rearwardly, an endless conveyor extending upwardly, a back plate for said housing embodying as a continuation thereof a trough portion that extends lower than and between said endless conveyors, said trough portion embodying a resilient apron at the end thereof extending upwardly to said rearwardly extending conveyor, said back plate extending up the back of said housing adjacent to said upwardly extending conveyor whereby it serves as a guide plate to prevent articles being carried upwardly by said conveyor from dropping off, and means to actuate said conveyors.

7. Merchandise display apparatus comprising a housing, embodying a top, a guide sheet supported in said housing and extending downwardly, an endless conveyor below said guide sheet and extending rearwardly, an endless conveyor extending upwardly, a vizor member extending from the top of said housing forwardly of and spaced from and extending lower than the top of said upwardly extending conveyor and the top of said guide sheet, and means to actuate said conveyors.

8. Merchandise display apparatus comprising a housing, embodying a top and exterior opposite side members, interior opposite side members extending therefrom inwardly and rearwardly, a guide sheet extending from the upper portion of said housing downwardly and extending between and fastened to said interior side members, a vizor member extending from the top of said housing forwardly of and spaced from said guide sheet and extending laterally to said interior side members, conveyor means lower than said guide sheet to receive articles and carry them until they reach a point above said guide sheet rearwardly of said vizor member, and means to actuate said conveyor means.

9. Apparatus for displaying popcorn and the like comprising a housing, guide means in said housing extending downwardly, a conveyor lower than said guide means adapted to receive articles and carry them rearwardly, another conveyor adapted to receive said articles and carry them upwardly above said guide sheet embodying lifter members having a resilient blade portion that extends outwardly from said conveyor, and means to actuate said conveyor.

10. Apparatus for displaying popcorn and the like comprising a housing, guide means in said housing extending downwardly, a conveyor lower than said guide sheets adapted to receive articles and carry them rearwardly, another conveyor adapted to receive said articles and carry them upwardly above said guide sheet embodying lifter members having a right angled member of non-resilient material attached to said conveyor and a blade portion of resilient material extending outwardly therefrom, and means to actuate said conveyor.

11. Merchandise display apparatus comprising a housing embodying exterior opposite side members at the front thereof and interior opposite side members extending therefrom inwardly and rearwardly, exterior opposite side members inset from said other exterior side members and extending rearwardly, a guide sheet extending from the upper portion of said housing downwardly in front of said inset side members, and extending between and to said interior side members, conveyor means lower than said guide sheet to receive articles and carry them until they reach a point above said guide sheet, and means to actuate said conveyor means.

12. Apparatus for displaying popcorn and the like comprising a housing, a guide sheet extending from the upper portion of said housing downwardly and having an S-curve therein, movable conveyor means embodying a portion lower than said guide sheet adapted to receive articles and other portions that extend upwardly to a point adjacent said guide sheet, lifter members carried by said other portions, and means to actuate said conveyor means.

13. Apparatus for displaying popcorn and the like comprising a housing, a guide sheet extending from the upper portion of said housing downwardly and having a convex curve in its upper portion and a concave curve in its lower portion, movable conveyor means embodying a portion lower than said guide sheet adapted to receive articles and other portions that extend upwardly to a point adjacent said guide sheet, lifter members carried by said other portions, and means to actuate said conveyor means.

THOMAS V. ATKINS.